United States Patent
Chavez et al.

(10) Patent No.: US 6,549,772 B1
(45) Date of Patent: *Apr. 15, 2003

(54) MULTIPLE ANTENNA CELLULAR NETWORK

(75) Inventors: David A. Chavez, Monte Sereno, CA (US); Ian L. Sayers, Redwood City, CA (US); Gerald F. Sage, Mountain View, CA (US)

(73) Assignee: Interwave Communications International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 09/583,823

(22) Filed: May 30, 2000

Related U.S. Application Data (63) Continuation of application No. 08/748,015, filed on Nov. 12, 1996, now Pat. No. 6,070,071, which is a continuation-in-part of application No. 08/582,512, filed on Jan. 3, 1996, now Pat. No. 6,078,823.
(60) Provisional application No. 60/006,656, filed on Nov. 13, 1995.

(51) Int. Cl.[7] ............................................... H04Q 7/36
(52) U.S. Cl. .................. 455/422; 455/101; 455/132; 455/524; 455/560; 455/562; 370/328; 375/347
(58) Field of Search ............................ 455/422, 436, 455/562, 529, 429, 101–105, 132–135, 277.1, 277.2, 69, 522, 524, 503; 370/328, 332, 334, 347; 375/220, 260, 347

(56) References Cited

U.S. PATENT DOCUMENTS

| | | | |
|---|---|---|---|
| 4,797,947 A | 1/1989 | Labedz | 455/69 |
| 5,023,900 A | 6/1991 | Taylor et al. | 455/424 |
| 5,235,615 A | 8/1993 | Omura | 375/200 |
| 5,243,598 A | 9/1993 | Lee | 455/436 |
| RE34,540 E | 2/1994 | Wu et al. | 455/20 |
| 5,363,428 A | 11/1994 | Nagashima | 379/58 |
| 5,590,404 A | 12/1996 | Sato et al. | 455/562 |
| 5,884,173 A | 3/1999 | Söllner | 455/436 |

FOREIGN PATENT DOCUMENTS

| | | | |
|---|---|---|---|
| WO | WO 93/10619 | 5/1993 | H04M/11/00 |
| WO | WO 94/05109 | 3/1994 | H04M/11/00 |

OTHER PUBLICATIONS

Lee, "Smaller Cells for Greater Performance", *IEEE* 29(11):19–23 (1991).

Kerpez and Ariyavisitakul, "A Radio Access System with Distributed Antennas", *IEEE* 3:1696–1700 (1994).

*Primary Examiner*—Lee Nguyen
(74) *Attorney, Agent, or Firm*—Dorsey & Whitney LLP (57) ABSTRACT

A multiple antenna cellular network communicates with a mobile station over a plurality of antennas. The antennas are arranged in a plurality of positions to customize a cell or cells. A transceiver is coupled to the antennas and configured to receive inbound information from the mobile station and transmit outbound information to the mobile station. A processor is coupled to the transceiver and configured to decode the inbound information and to encode the outbound information to communicate with the mobile station. In another embodiment, the transmit signal power is continuously modified to move interference nulls to improve quality so that a fixed location user can receive a high quality signal. Exemplary embodiments are provided for use with the Global Systems for Mobile Communication (GSM) protocol and can be applied to other digital technologies.

33 Claims, 6 Drawing Sheets

MULTIPLE ANTENNA CELLULAR NETWORK

RELATED APPLICATIONS

This is a continuation of application Ser. No. 08/748,015 filed on Nov. 12, 1996, now U.S. Pat. No. 6,070,071, issued May 30, 2000, which is a continuation-in-part of U.S. Ser. No. 08/582,512 filed on Jan. 3, 1996 U.S. Pat. No. 6,078,823 pending, claiming priority to U.S. Provisional Application Serial No. 60/006,656 filed Nov. 13, 1995, all incorporated herein by reference.

FIELD

The present invention relates to a multiple antenna cellular network. In particular, the invention is used in a cellular communication network to custom configure cell boundaries to accommodate obstacles such as walls, ceilings, floors and buildings, to reduce interference, to improve performance and to improve quality of service.

BACKGROUND

Standard cellular communication networks are generally divided into geographic cells. Each cell typically contains a central antenna, is circular and overlaps slightly with adjacent cells. Base transceiver station hardware is deployed near each antenna to communicate with mobile stations in that cell. Factors that influence cellular design and the amount of deployed hardware include the number of mobile stations to be serviced in a given area, the operational power levels of the mobile stations and base stations, and the presence or absence of obstacles. Other factors include the type of communication protocol such as time division multiple access (TDMA), frequency division multiple access (FDMA), code division multiple access (CDMA), or other type. The transmit power and the communication protocol generally define the size of each cell and how many users each cell can support.

When a cellular network is designed, a specified number of users can be serviced by a specified number of cells and associated hardware including the base transceiver stations. When a mobile station passes from one cell to another, a hand-off is performed to permit the mobile station to communicate with the base transceiver station that receives the strongest signal from the mobile station. However, in some circumstances, signals are blocked by obstacles such as buildings and mountains. To accommodate these obstacles, multi-path signal processing is performed, but it is not successful at all possible locations. To service all locations, additional antennas or repeaters must be deployed to create additional cells or enhance coverage even though no additional capacity may be supported. This type of hardware deployment is not efficient.

Low power cellular networks, such as those designed to service a building, have similar problems. In this case, the obstacles are walls, floors and ceilings. To accommodate these obstacles, additional antennas are deployed to create additional cells. Again, the result is that additional antenna or repeater hardware is deployed without an associated increase in the number of serviced mobile stations. Similarly, this deployment is not efficient.

Hence, one limitation of existing systems is that they require additional antenna or repeater hardware to provide service to mobile stations that move behind an obstacle. This results in a deployment of a large amount of hardware for the purpose of communicating with a statistically small number of mobile stations.

SUMMARY

The present invention relates to a multiple antenna cellular network. In particular, the invention is used in a cellular communication network to custom configure cell boundaries to accommodate obstacles such as walls, ceilings, floors and buildings, to reduce interference, to improve performance and to improve quality of service. Exemplary embodiments are provided for use with the Global Systems for Mobile Communication (GSM) protocol and can be applied to other cellular communication and digital technologies.

A multiple antenna cellular network communicates with a mobile station over a plurality of antennas. The antennas are arranged in a plurality of positions to customize a cell or cells. A transceiver is coupled to the antennas and configured to receive inbound information from the mobile station and transmit outbound information to the mobile station. A processor is coupled to the transceiver and configured to decode the inbound information and to encode the outbound information to communicate with the mobile station.

In another embodiment, the antennas are similarly deployed to create a cell or cells. The transmit signal power is continuously varied to improve quality and to move the nulls so that a fixed location user can receive a high quality signal.

Advantages of the invention include improved cell boundary control, reduced interference, fault tolerance and more efficient use of radio resources. Additionally, mobile users will experience improved battery life because of lower mobile station transmit power requirements.

BRIEF DESCRIPTION OF THE DRAWINGS

Additional advantages of the invention will become apparent upon reading the following detailed description and upon reference to the drawings, in which.

DETAILED DESCRIPTION

The present invention relates to a multiple antenna cellular network. In particular, the invention is used in a cellular communication network to custom configure cell boundaries to accommodate obstacles such as walls, ceilings, floors and buildings, to reduce interference, to improve performance and to improve quality of service. Exemplary embodiments are provided for use with a TDMA communication protocol and the Global Systems for Mobile Communication (GSM) communication protocol and can be applied to other cellular communication and digital technologies. An overview of GSM is described in the U.S. patent application SPREAD SPECTRUM COMMUNICATION NETWORK WITH ADAPTIVE FREQUENCY AGILITY, U.S. Ser. No. 08/474,597, filed on May 4, 1995.

Exemplary embodiments are described herein with reference to specific configurations and protocols. For example, the embodiments are described as employing non-frequency-hopping communication, but could be implemented to frequency hop. Those skilled in the art will appreciate that various changes and modifications can be made to the exemplary embodiments while remaining within the scope of the present invention. The invention can be employed using any TDMA, FDMA, CDMA or other similar communication protocol.

Network Configuration

Figure 1:
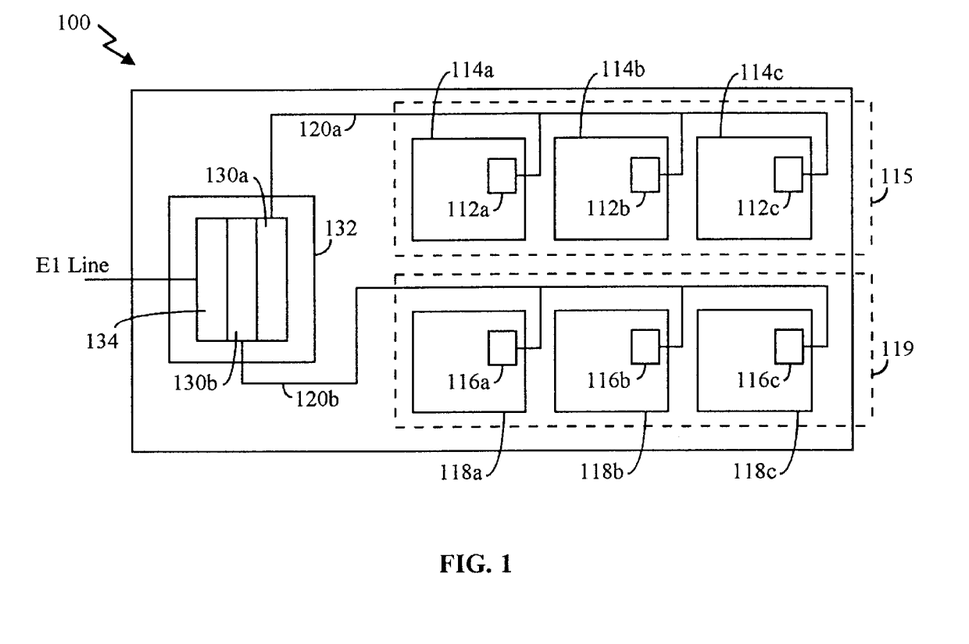
FIG. 1 depicts a multiple antenna cellular network showing a customized cell, several remote transceivers, a local transceiver according to an embodiment of the invention.

FIG. 1 is a general illustration of a multiple antenna cellular network according to an embodiment of the invention. FIG. 1 shows two cells 115 and 119 in a building installation. While the embodiment is explained with reference to cell 115 and the components thereof, the explanation is equally applicable to cell 119 and the components thereof.

A plurality of remote transceivers 112a–c are positioned at a number of locations 114a–c to develop cell 115. Each location 114a–c represents a sub-cell that develops cell 115. For example, remote transceivers 112a–c can be placed in rooms or in hallways to develop cell 115. Cell 115 has a shape that is defined by remote transceivers 112a–c and the radiated power associated with each remote transceiver 112a–c. In this embodiment, all remote transceivers 112a–c have common transmit and receive cycles (explained below). This makes it possible for a mobile station to roam among sub-cells 114a–c within cell 115 and experience continuous high quality communication.

All remote transceivers 112a–c are coupled, via data link 120a, to a local transceiver 130a. Similarly, all remote transceivers 116a–c are coupled, via data link 120b, to a local transceiver 130b. Data links 120a–b can be coaxial cables, fiber-optic cables, or other type of communication medium such as RF links. Moreover, any number of remote transceivers can be coupled to a local transceiver. Six remote transceivers per local transceiver is a typical configuration. This configuration permits a number of remote transceivers to be positioned at a number of locations to provide a custom cell having any physical space parameters. For example, the cell can be an entire building, a single floor in a building, a half floor in a building, a block of buildings, or any other physical space parameters.

Local transceivers 130a–b are mounted on printed circuit boards that fit into a housing 132 and communicate over a backplane with a communication interface card 134 such as an E1 interface card. Any number of local transceivers can be placed into housing 132 to increase the number of available cells communicating through the E1 communication interface 134. Six local transceivers per housing is a typical configuration. Moreover, additional E1 cards can be added to boost communication throughput. While this embodiment uses an E1 card, any communication interface can be used with the invention such as a T1, PSTN, Ethernet, ISDN or other type of communication interface. An explanation of a physical configuration can be found in CELLULAR BASE STATION WITH INTELLIGENT CALL ROUTING, U.S. Ser. No. 08/474,598 filed on May 4, 1995.

Two basic network configurations are anticipated: a bus configuration, where each remote transceiver taps onto a cable; and a star configuration, where each remote transceiver is connected via an independent cable. For example, an in-building system can use a bus configuration where a single local transceiver is connected to multiple remote transceivers attached to a single bus. A star configuration, on the other hand, is configured to connect local transceivers to multiple remote transceivers using a dedicated cable for each remote transceiver. The actual implementation will depend on various factors including the cell physical space parameters, the number of mobile stations that each cell must support, and the addressing technique that is used to identify the remote transceivers and to track the mobile stations. The remote transceivers shown in FIG. 1 are connected in a bus configuration. The mobile station communication frequencies, and inbound and outbound TDMA time slots are assigned to the mobile station upon call initialization and the mobile station can move among sub-cells 114a–c in cell 115 while remaining on the same communication frequencies.

Two exemplary embodiments are used to explain the invention in more detail. Those skilled in the art will recognize that modifications can be made to the embodiments while remaining within the scope of the invention.

A. First Embodiment

A first embodiment is described with reference to FIGS. 1 through 6. In his embodiment, remote transceivers 112a–c all receive the inbound information from the mobile station and process the inbound information to determine which one has the strongest signal. Then, the remote transceiver with the strongest signal communicates the inbound information to local transceiver 130a via data link 120a. Outbound information is simultaneously transmitted by all remote transceivers 112a–c to the mobile station on the assigned outbound frequency and during the assigned outbound TDMA time slot.

Information Processing

Inbound information must be processed in an orderly fashion to assure that the correct remote transceiver 112a–c with the strongest signal communicates the inbound information to local transceiver 130a for each TDMA time slot. Moreover, outbound information must be processed in an orderly fashion to assure that correct power levels are transmitted according to a predefined method for each TDMA time slot.

Figure 2:
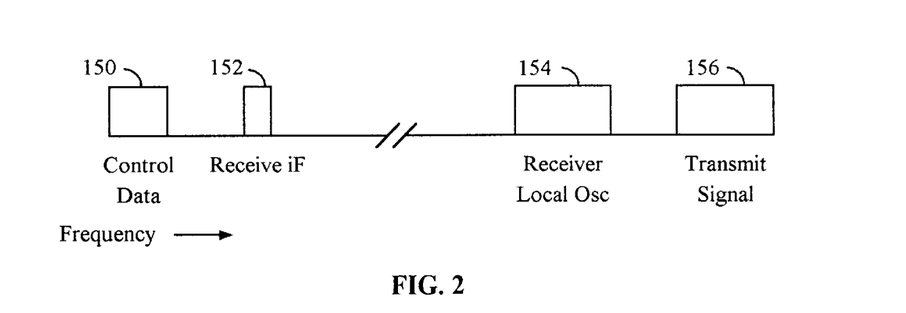
FIG. 2 depicts the communication frequency spectrum between a remote transceiver and a local transceiver according to a first embodiment of the invention.

FIG. 2 shows the frequency allocation for data link 120a. Reference 150 is the control information frequency between remote transceivers 112a–c and local transceiver 130a. The control information is depicted in greater detail in FIG. 3 which shows three general divisions A, B and C. Division A is a communication from the local transceiver to the remote transceivers. Division A has a 2 byte preamble, a 1 byte receiver select and a 6 byte transmit power level. The receiver select byte identifies which remote transceiver is selected to communicate the inbound information for the following inbound information time slot. The transmit power level 6 bytes informs the remote transceivers what power level to transmit. Division B is a 1 byte delay allowing for received signal strength indicator (RSSI) measurement (explained below). Division C is a communication from the remote transceivers to the local transceiver. Division C has 6 bytes that communicate the RSSI levels from the remote transceivers to the local transceiver for each of the remote transceivers. While division C is shown to have 6 bytes, division C can be modified to include a greater or lesser number of bytes to accommodate a greater or lesser number of remote transceivers. The control information including divisions A, B and C takes 576 μs for a complete transfer. Each byte includes 1 start bit and 2 stop bits for 11 bits per byte of data. The result is a minimum bit period of 3.27 μs.

FIG. 2 further shows reference 152 as the inbound information frequency. This is the frequency that the selected remote transceiver will use to communicate the inbound information to the local transceiver for the inbound information time slot. Reference 154 is a oscillator frequency that keeps the remote transceiver and local transceiver synchronized. Reference 156 is the outbound information frequency. This is the frequency that the local transceiver uses to communicate outbound information to the remote transceivers.

Figure 4:
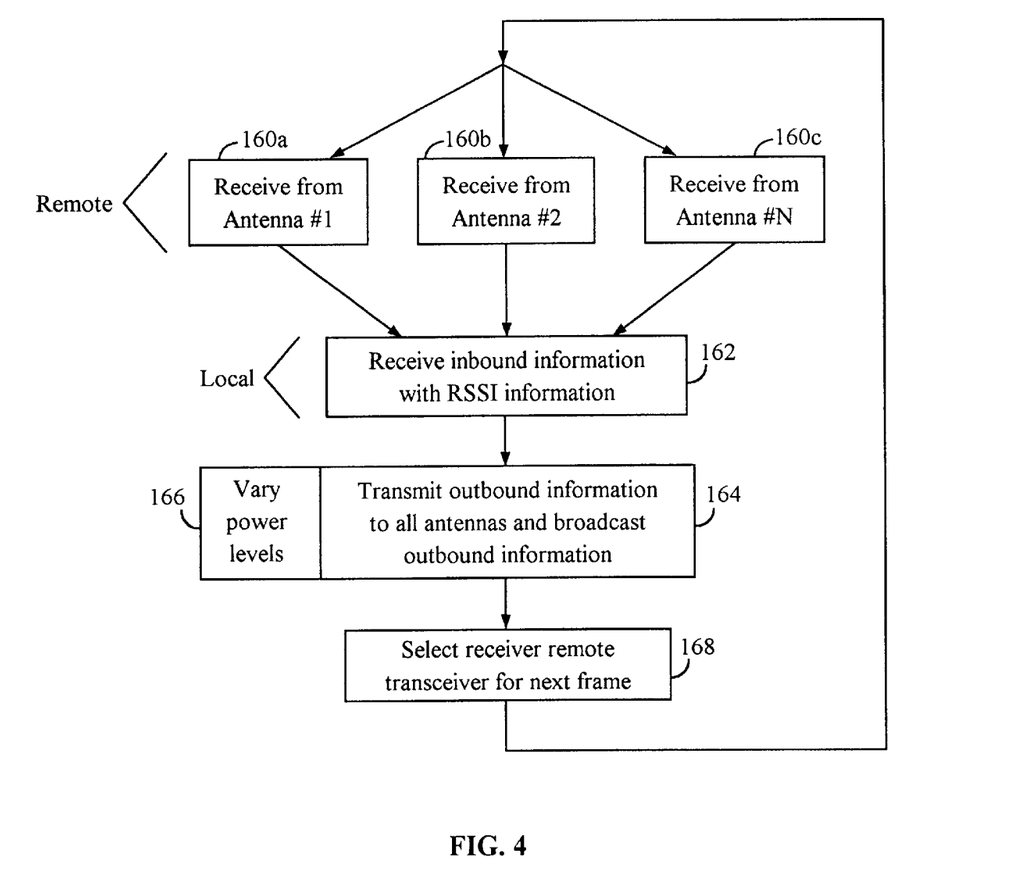
FIG. 4 is a flow chart showing operation of a multiple antenna cellular network according to the first embodiment of the invention.

A flowchart operation for the exemplary embodiment is depicted in FIG. 4. This flowchart depicts a number of procedures that include inbound information processing and outbound information processing for the first embodiment. In steps 160a–c all remote transceivers 112a–c receive inbound information from all mobile stations in the cell and measure the received signal strength. In step 162, the selected remote transceiver passes inbound information to local transceiver 130a and all the remote transceivers pass RSSI information to local transceiver 130a, for each time slot of the TDMA frame. Local transceiver 130a determines which remote transceiver 112a–c has the greatest signal strength for each received signal. When a mobile station moves into another sub-cell 114a–c (within the same cell 115), a stronger receive signal will be observed from a different remote transceiver. The local transceiver will note that a new remote transceiver should be used as the receiver, and the old remote receive should be discontinued. The local transceiver makes a decision to transfer remote transceivers on the next TDMA frame.

In step 164, local transceiver 130a sends outbound information to all remote transceivers 112a–c. Along with the outbound information is power level information depicted in FIG. 3 division A. At step 166, local transceiver 130a varies the power levels for each remote transceiver 112a–c every TDMA frame in order to physically move the nulls. In step 168, the new remote transceiver is notified of its selection for a particular received time slot for the next TDMA frame. Step 168 then returns the process to the beginning (steps 160a–c).

The procedures described in the FIG. 4 flowchart are now described with reference to an exemplary remote transceiver 112a and an exemplary local transceiver 130a.

Inbound Information Processing

Figure 5:
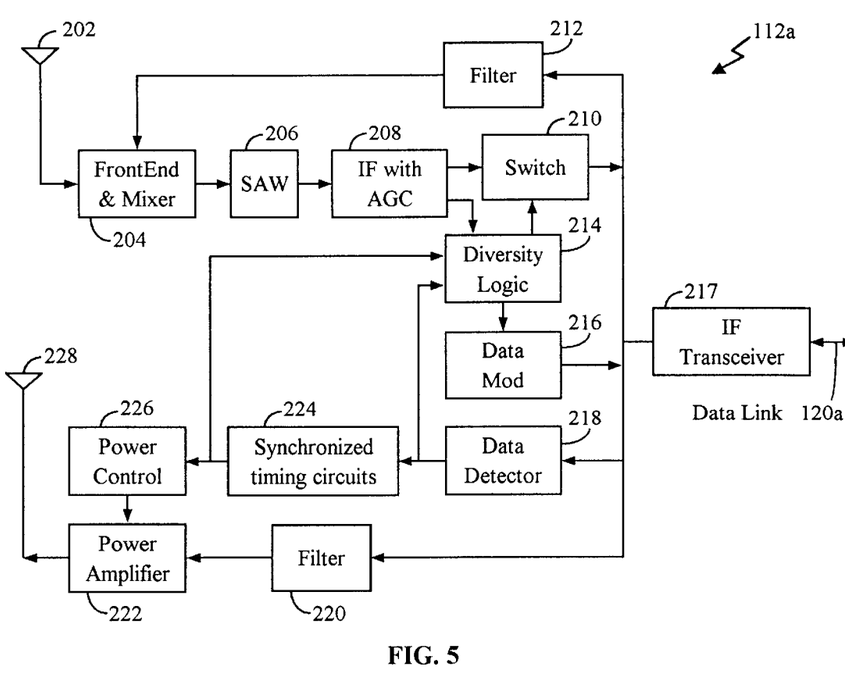
FIG. 5 is a schematic of a remote transceiver according to the first embodiment of the invention.

FIG. 5 depicts a remote transceiver 112a. A plurality of remote transceivers 112a–c are designed for deployment at various locations 114a–c to construct cell 115. Remote transceiver 112a includes a receive antenna 202 to receive an inbound signal containing inbound information from the mobile stations. This corresponds to flowchart step 160a. Each mobile station is assigned a transmit TDMA time slot and instructed to transmit on a particular frequency. For example, the GSM base station receive band (corresponding to the mobile station transmit band) is from 890–915 MHz, in 200 KHz increments.

Once the inbound signal is received from the mobile station, a front end mixer 204 begins the down-conversion. Mixer 204 receives its local oscillator (LO) input signal from filter 212, which receives its input from local transceiver 130 via an analog link over cable 120a. A surface acoustic waveform (SAW) filter 206 continues the down-conversion process. The result is an inbound intermediate frequency (IF) signal of approximately 10.7 MHz. An automatic gain control 208 serves to maintain the IF signal at a consistently high level. The IF signal is then provided to both a switch 210 and a diversity logic circuit 214.

Switch 210 is set in the previous frame by local transceiver 130a. Switch 210 is set so that the remote transceiver with the greatest signal strength will be selected to deliver the inbound information from the mobile station allocated to the specified inbound time slot. That is, each remote transceiver sets its switch 210 with respect to each time slot in the TDMA frame. For example, if a particular remote transceiver had the greatest signal strength for mobile stations allocated to time slots one and four, that remote transceiver would set its switch 210 to permit the IF for time slots one and four to be transmitted over data link 120a.

Figure 3:
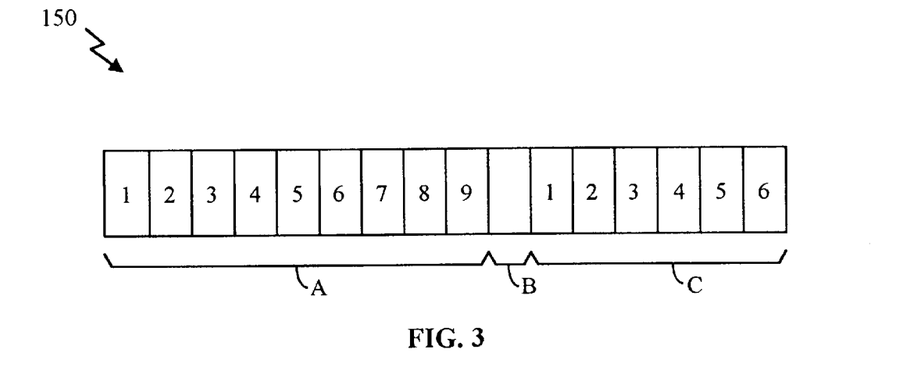
FIG. 3 depicts a control data word communicated between a remote transceiver and a local transceiver according to the first embodiment of the invention.

Diversity logic circuit 214 measures the inbound signal strength and generates a received signal strength indicator (RSSI) for each inbound signal for each time slot. This corresponds to flowchart step 162. Diversity logic circuit 214 receives a synchronization signal from synchronized timing circuits 224 in order to properly gather the RSSI information. The RSSI information is digitized and modulated by data modulator 216. The RSSI information is encoded into a data word and transmitted to local transceiver 130a for every reception, as shown in FIG. 3. As shown, the data word employs 16 bytes with 6 bytes (C1–C6) for communicating RSSI information from remote transceivers to local transceiver 130a via data link 120a. Thus, up to six remote transceivers can be supported in each exemplary cell. Of course, more remote transceivers can be configured in alternate embodiments.

Figure 6:
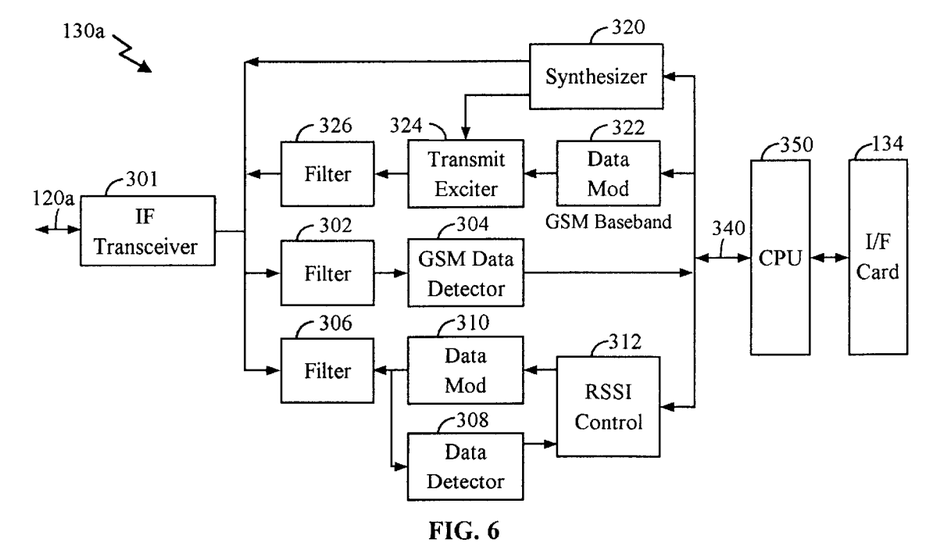
FIG. 6 is a schematic of a local transceiver according to the first embodiment of the invention.

FIG. 6 depicts local transceiver 130a where inbound information is received over data link 120a and filtered by filters 302 and 306. Filter 302 has a center frequency of approximately 10.7 MHz, while filter 306 has a center frequency of approximately 48 MHz.

Filter 302 passes the inbound information to a GSM data detector 304 that communicates directly with CPU 350. A signal processing function to decode the inbound information is performed by CPU 350. Alternatively, a signal processor can be employed to decode the inbound information. Once CPU 350 has decoded the inbound information, CPU 350 transmits the inbound information to E1 interface card 134, which transmits the information to a base station controller (BSC), a mobile services center (MSC), a PBX, or other similar telephone network.

Filter 306 passes inbound RSSI information to a data detector 308. RSSI control 312 receives the RSSI information and determines which remote transceiver has the greatest received signal strength, further corresponding to flowchart step 162. RSSI control 312 stores the RSSI information to select the inbound information from the remote transceiver receiving the strongest signal. The selection is performed at the next frame by sending the selection information (FIG. 3 division A) outbound via control information data modulator 310 and setting switch 210 in the selected remote transceiver 112a. This corresponds to flowchart step 168. This step permits RSSI control 312 to control reception from the mobile stations on a frame by frame basis. At the next frame interval, RSSI control 312 will instruct the remote transceiver with the strongest RSSI (from the last frame) to operate its switch 210 to place the inbound information on data link 120a.

Outbound Information Processing

Outbound information is received from a remote network via E1 card 134.

CPU 350 encodes the outbound information in preparation for transmission to the mobile stations. In this embodiment, corresponding to flowchart step 164, all remote transceivers simultaneously broadcast the outbound information to the mobile stations. This insures reception by the intended mobile station and reduces control complexity. However, individual transmission by selected remote transceivers is anticipated in an alternate embodiment.

For the outbound communication, similar to the inbound communication, each mobile station is assigned a receive TDMA time slot and instructed to receive on a particular frequency. For example, the GSM base station transmit band (corresponding to the mobile station receive band) is from 935–960 MHz, in 200 KHz increments.

CPU 350 delivers the encoded outbound information to synthesizer 320 and data modulator 322. Both these circuits communicate to a transmit exciter 324 that passes the information to filter 326 and then to remote transceiver 112a.

A problem that arises during simultaneous transmission of the outbound information is interference. Since every remote transmitter transmits the outbound information, overlaps will occur at various locations causing standing nulls where the transmit power is significantly attenuated and a mobile station has difficulty receiving a quality signal. Standing nulls are especially problematic in office settings where a mobile station may stay in a single location for a period of time, such as at a desk. To alleviate the problem of standing nulls, the outbound signal power is varied on a frame by frame basis. The local transceiver accomplishes this by sending a transmit power level signal to the remote transceivers to control the remote transceiver transmit level. This is included in the control information of FIG. 3 division A and corresponds to flowchart step 166. By altering the transmit power on a frame by frame basis, nulls are physically moved on a frame by frame basis. Thus, in operation a single frame may be lost because the mobile station is located at a null, but the next frame will be received because the null is moved away from the previous null where the mobile station is located. In this manner, data loss due to nulls is practically eliminated because known error correction codes can reconstruct a complete message even with loss of information from a single frame.

Once remote transceiver 112a receives the outbound information, filter 220 receives the outbound information and passes it to power amplifier 222. Simultaneously, data detector 218 receives the outbound information from local transceiver 130a, and passes that information to a synchronized timing circuit 224. Timing circuit 224 then adapts power control circuit 226 to vary the output power level on a frame by frame basis as instructed by RSSI control 312 (encoded in the data word). This modification of power levels serves to move nulls and to promote high quality communication with a fixed location mobile station.

B. Second Embodiment

A second embodiment is described with reference to FIGS. 1, and 7 through 14. In this embodiment, control is migrated from remote transceivers 112a–c to local transceiver 130a. As in the first embodiment, inbound information from the mobile stations is received by all remote transceivers 112a–c. However, unlike the first embodiment, the remote transceivers do not determine the signal strength of the inbound information signal, but rather pass the inbound signal directly to local transceiver 130a. Also, the inbound RF signal down-conversion of the inbound RF signal is performed by local transceiver 130a instead of remote transceivers 112a–c. Consequently, the architecture of remote transceivers 112a–c in the second embodiment is simpler than the first embodiment. This simplified design translates to significant cost savings. As in the first embodiment, outbound information is simultaneously transmitted by all remote transceivers 112a–c to the mobile station on the assigned outbound frequency and during the assigned outbound TDMA time slot.

Information Processing

Figure 7:
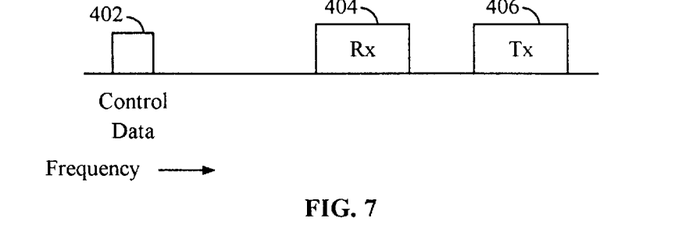
FIG. 7 depicts the communication frequency spectrum between a remote transceiver and a local transceiver according to a second embodiment of the invention.

FIG. 7 depicts the frequency allocation for data link 120a in the second embodiment. Reference 402 corresponds to the control data word that is communicated between remote transceivers 112a–c and local transceiver 130a. Unlike the first embodiment, control word 402 does not contain the RSSI information. Reference 404 corresponds to the inbound information frequency. Remote transceivers 112a–c use this frequency to communicate the inbound information to local transceiver 130a for the inbound information time slot. In a GSM-900 environment, this signal has a frequency range of approximately 890-915 MHz. Reference 406 corresponds to the outbound information frequency. Local transceiver 130a uses this frequency to communicate outbound information to remote transceivers 112a–c. In a GSM-900 environment, this signal has a frequency range of approximately 935–960 MHz. The frequencies called out for transmit and receive are the system frequencies without translation. For extended GSM, GSM-1900 or other bands using the OSM protocol, the frequencies would be different.

Figure 8:
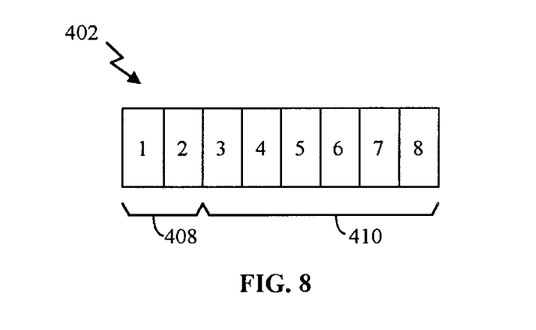
FIG. 8 depicts a control data word communicated between a remote transceiver and a local transceiver according to the second embodiment of the invention.

FIG. 8 depicts the details of control data word 402 for the second embodiment. As shown, the control information is made up of 8 bytes—a 2 byte preamble 408 and 6 bytes 410 to carry the transmit power level information from local transceiver 130a to remote transceivers 112a–c. As in the first embodiment, the transmit power level information informs remote transceivers 112a–c at what power level to transmit the outbound signal.

Figure 9:
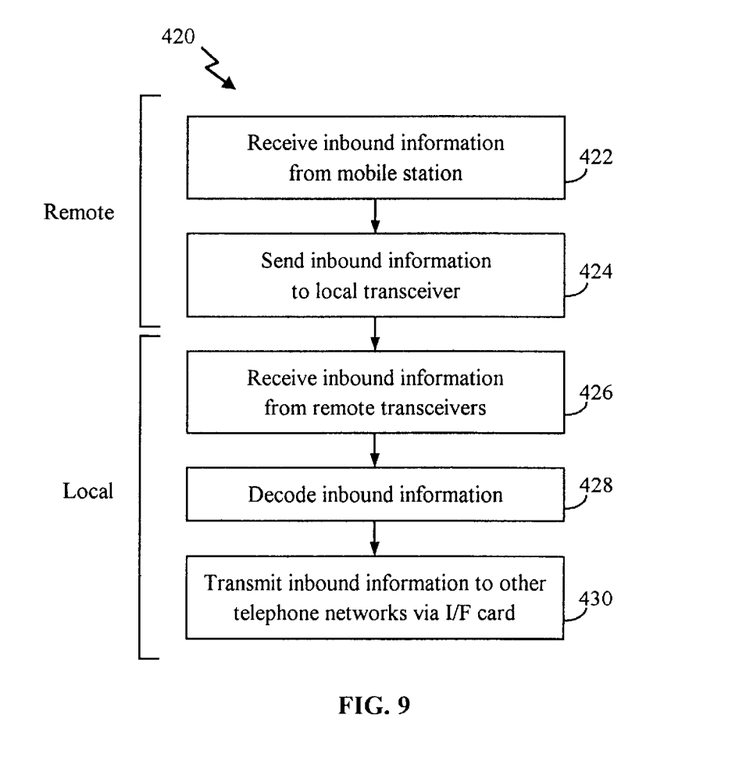
FIG. 9 is a flow chart showing inbound information processing in a multiple antenna cellular network according to the second embodiment of the invention.
Figure 10:
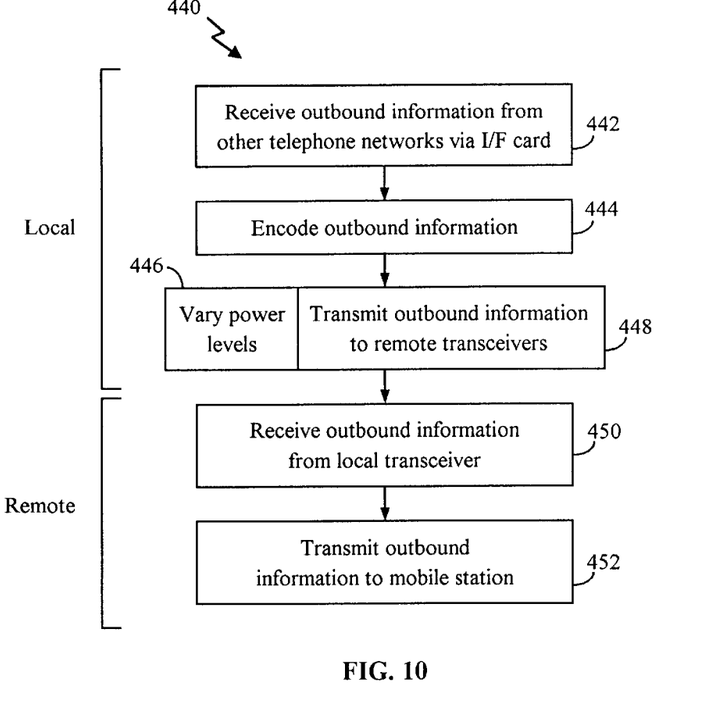
FIG. 10 is a flow chart showing outbound information processing in a multiple antenna cellular network according to the second embodiment of the invention.
Figure 11:
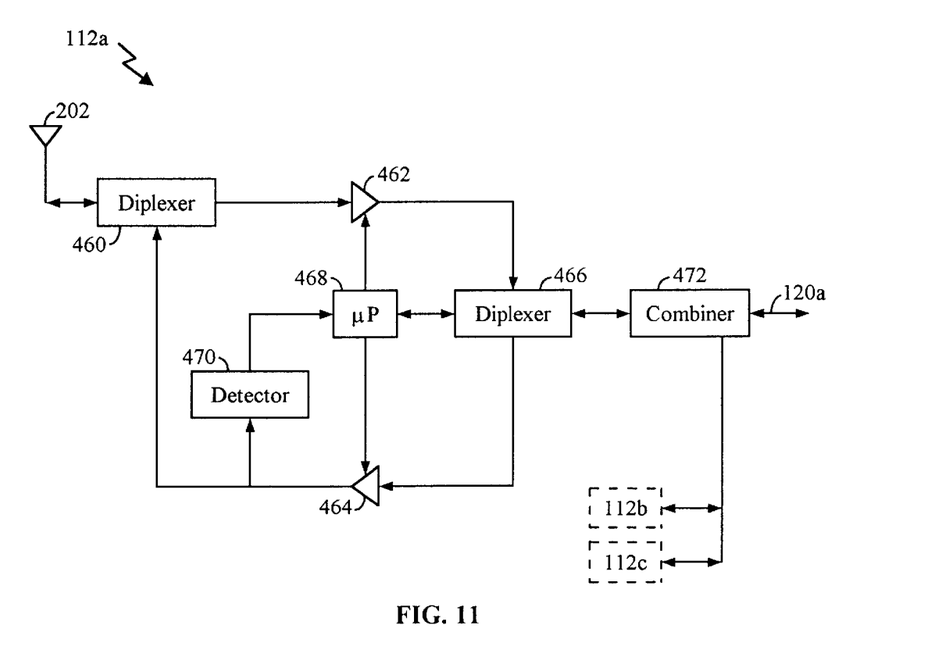
FIG. 11 is a schematic of a remote transceiver according to the second embodiment of the invention.
Figure 12:
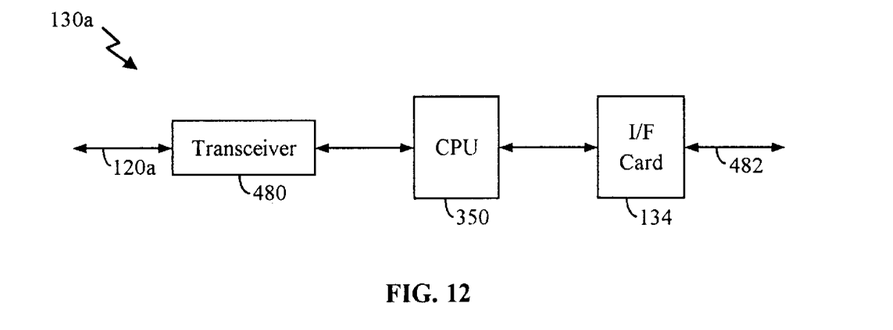
FIG. 12 is a schematic of a local transceiver according to the second embodiment of the invention.

The inbound and outbound information processing procedures are explained in further detail using the flowcharts depicted in FIGS. 9 and 10 with reference to an exemplary remote transceiver 112a depicted in FIG. 11 and an exemplary local transceiver 130a depicted in FIG. 12.

Inbound Information Processing

FIG. 9 shows a flowchart 420 depicting the steps involved in inbound information processing performed by the second embodiment. Inbound information processing is initiated at step 422, when remote transceivers 112a–c receive inbound information from mobile stations. As in the first embodiment, a plurality of remote transceivers 112a–c are designed for deployment at various locations 114a–c to construct cell 115 (as shown in FIG. 1). Remote transceiver 112a uses antenna 202 to receive inbound signals containing inbound information from the mobile stations. As in the first embodiment, each mobile station is assigned a transmit TDMA time slot and instructed to transmit on a particular frequency.

The inbound information signal received by antenna 202 is then routed via diplexer 460 to variable gain amplifier 462 which boosts the inbound signal power. After passing through variable gain amplifier 462, the inbound information signal is routed through a second diplexer 466. The resultant signal emerging from diplexer 466 contains the inbound signal at a frequency equivalent to the received RF frequency (approximately 890–915 MHz). At step 424, all remote transceivers 112a–c pass the inbound information signal to combiner 472 which communicates the inbound information signal to local transceiver 130a via data link 120a, for each time slot of the TDMA frame.

At step 426, local transceiver 130a receives inbound information from remote transceivers 112a–c. The inbound signal has a frequency range of 890–915 MHz (RF). As mentioned earlier, the demodulation and down-conversion of the RF signal to intermediate frequency (IF) signal is performed by local transceiver 130a depicted in FIG. 12. At step 428, CPU 350 decodes the inbound information signal and transmits the decoded inbound signal to interface card 134 (an exemplary transceiver function is described in SPREAD SPECTRUM COMMUNICATION NETWORK WITH ADAPTIVE FREQUENCY AGILITY; U.S. patent application Ser. No. 08/474,597 filed on May 4, 1995). At step 430, interface card 134 transmits the inbound information signal to either a base station controller (BSC), a mobile service center (MSC), a PBX, or some other similar telephone network over line 482. This function completes the inbound information processing performed by the second embodiment.

Outbound Information Processing

FIG. 10 shows a flowchart 440 depicting the steps involved in outbound information processing performed by the second embodiment. Outbound information processing is initiated at step 442, when a local transceiver 130a receives an outbound information signal from another telephone networks via interface card 134. At step 444, CPU 350 encodes the outbound information signal. As in the first embodiment, at optional step 446, local transceiver 130a instructs the remote transceivers to vary the transmit power on a frame by frame basis to reduce any problems associated with standing nulls. The transmit power level information is encoded in bytes 3–8 (410) of control data word 402 shown in FIG. 8. At step 448, the encoded outbound RF signal comprising the outbound information and the control data word is transmitted to all remote transceivers 112a–c via data link 120a.

At step 450, all remote transceivers 112a–c coupled to local transceiver 130a via data link 120a receive the outbound information RF signal transmitted by local transceiver 130a. The outbound information is routed via diplexer 466 to variable gain amplifier 464. Microprocessor 468 then decodes the transmit power level information contained in bytes 3–8 (410) of control word 402 and uses the decoded information to vary the output power level on a frame by frame basis by controlling the gain of variable gain amplifier 464. The modification of power levels serves to move nulls and to promote high quality communication with a fixed location mobile station.

At step 452, all remote transceivers 112a–c simultaneously broadcast the outbound information to the mobile stations. This insures reception by the intended mobile station and reduces control complexity. This completes the outbound information processing performed by the second embodiment. While the second embodiment is described as having remote transceivers that simultaneously broadcast the outbound information, individual transmission by selected remote transceivers is anticipated as an alternate embodiment.

Self Test

In the remote transceiver implementation depicted in FIG. 11, local transceiver 130a sets the power gain of variable gain amplifier 462 during inbound signal self test. Variable gain amplifier 462 ensures that the inbound signal communicated to local transceiver 130a is above an acceptable threshold power level. The local transceiver initiates a self test by sending a signal to all remote transceivers 112a–c instructing them of the expected power level for the inbound information signal. The expected power level information is of sufficient value to ensure that the quality of the inbound signal received by local transceiver 130a is above some acceptable threshold value. Microprocessor 468 stores the inbound power level information and uses it to set the gain of variable gain amplifier 462.

The power gain of variable gain amplifier 464 is set during outbound signal self test. The local transceiver informs the remote transceivers of a predetermined outbound signal power level. The local transceiver then drives a outbound signal to all the remote transceivers 112a–c. The signal is routed via diplexer 466 to variable gain amplifier 464. Detector 470 monitors the power strength of the signal coming out of variable gain amplifier 464 and feeds the information to microprocessor 468. Microprocessor 468 then accordingly sets the gain of variable gain amplifier 464 to the predetermined outbound signal power level.

Figure 13:
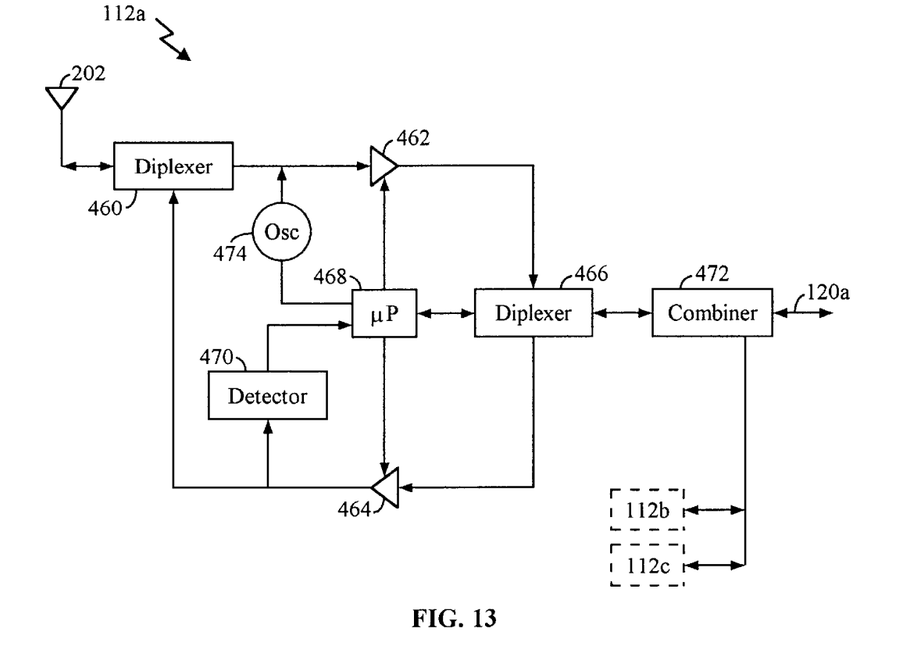
FIG. 13 is a schematic of a remote transceiver according to an alternate implementation of the second embodiment of the invention.
Figure 14:
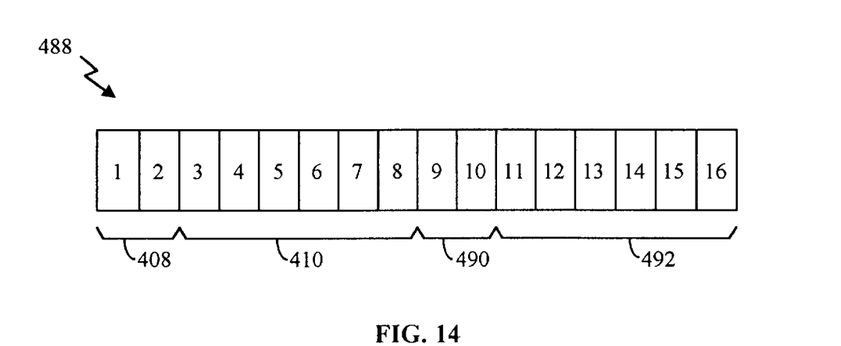
FIG. 14 depicts a control data word communicated between a remote transceiver and a local transceiver according to the alternate implementation of the second embodiment of the invention.

In an alternate implementation depicted in FIG. 13, the local transceiver sets the expected inbound signal power level specific to each remote transceiver. In this implementation, an oscillator 474 is added to the remote transceiver architecture. During inbound signal self test, oscillator 474 drives a signal into variable gain amplifier 462 which is sent to local transceiver 130a as inbound information. Local transceiver 130a measures the strength of the inbound signal received from remote transceiver 474 and based on the measured strength, sends a signal back to that particular remote transceiver instructing it whether to increase or decrease the amplifier control power level. To accomplish this communication between the remote and the local transceiver, the control word 488 is modified as shown in FIG. 14. In addition to the eight byte control word 402 depicted in FIG. 8, eight extra bytes are added. Bytes 9–10 (490) store the address of the remote transceiver sending the inbound signal to the local transceiver at self test time. This address information uniquely identifies the remote transceiver. Bytes 11–16 (492) store the expected inbound power level information communicated by the local transceiver to the remote transceiver identified by address bytes 490. While two bytes are used for the remote transceiver address in this implementation, more or less bytes may be used to accommodate a greater or lesser number of remote transceivers.

Conclusion

Advantages of the present invention include improved cell boundary control, reduced interference, fault tolerance, and more efficient use of radio resources. Additionally, mobile users will experience improved battery life because of lower mobile station transmit power requirements.

Having disclosed exemplary embodiments and the best mode, modifications and variations may be made to the disclosed embodiments while remaining within the scope of the present invention as defined by the following claims.

What is claimed is:

1. A multiple antenna cellular network for communicating with a mobile station within a cell, comprising:
   a plurality of antennas positioned to produce the cell;
   a transceiver coupled to said antennas and configured to receive inbound information from said mobile station and transmit outbound information to said mobile station, said transceiver including a plurality of remote transceivers each coupled to said antennas and a local transceiver coupled to a processor and coupled to said remote transceivers, wherein a control word containing address information and configuration information for individual remote transceivers is transmitted between the local transceiver and the remote transceivers such that the local transceiver uses the control word to individually configure said each remote transceiver to vary outbound information output power to move nulls in the cell;
   said processor coupled to said transceiver and configured to decode said inbound information and to encode said outbound information to communicate with said mobile station.

2. The multiple antenna cellular network of claim 1, wherein:
   said transceiver includes a plurality of remote transceivers each coupled to said antennas and a local transceiver coupled to said processor and coupled to said remote transceivers.

3. The multiple antenna cellular network of claim 2, wherein:
   said remote transceivers are configured to simultaneously transmit said inbound information to said local transceiver.

4. The multiple antenna cellular network of claim 5, wherein:
   said remote transceivers are configured to simultaneously transmit said outbound information.

5. The multiple antenna cellular network of claim 4, wherein:
   said remote transceivers are configured to vary outbound information output power to move nulls in the cell.

6. The multiple antenna cellular network of claim 2, wherein:
   said remote transceivers are configured to measure an inbound information power level from said mobile station and to communicate said inbound information power level to said local transceiver; and
   said local transceiver is configured to select inbound information from the remote transceiver having the greatest inbound information power level.

7. The multiple antenna cellular network of claim 2 for further communicating with a second mobile station within the cell, wherein:
   said remote transceivers are configured to measure an inbound information power level from said mobile station and to communicate said inbound information power level to said local transceiver;
   said remote transceivers are configured to measure a second inbound information power level from said second mobile station and to communicate said second inbound information power level to said local transceiver;
   said local transceiver is configured to select inbound information from the remote transceiver having the greatest inbound information power level and to select second inbound information from the remote transceiver having the greatest second inbound information power level;
   said remote transceiver having the greatest inbound information power level is configured to communicate said inbound information to said local transceiver during a first time period; and
   said remote transceiver having the greatest second inbound information power level is configured to communicate said second inbound information to said local transceiver during a second time period.

8. The multiple antenna cellular network of claim 2, wherein:
   each of said remote transceivers includes an RF transceiver to communicate information with said mobile station, a converter to convert RF information to IF information and to convert IF information to RF information, and an IF transceiver to communicate IF information with said local transceiver; and
   said local transceiver includes an IF transceiver to communicate IF information with said remote transceivers and an interface circuit to communicate information with said processor.

9. The multiple antenna cellular network of claim 8, wherein:
   said remote transceivers are configured to vary outbound information output power to move nulls in the cell.

10. The multiple antenna cellular network of claim 8, wherein:
    said remote transceivers are configured to measure an inbound information power level from said mobile station and to communicate said inbound information power level to said local transceiver; and
    said local transceiver is configured to select inbound information from the remote transceiver having the greatest inbound information power level.

11. The multiple antenna cellular network of claim 8 for further communicating with a second mobile station within the cell, wherein:
    said remote transceivers are configured to measure an inbound information power level from said mobile station and to communicate said inbound information power level to said local transceiver;
    said remote transceivers are configured to measure a second inbound information power level from said second mobile station and to communicate said second inbound information power level to said local transceiver;
    said local transceiver is configured to select inbound information from the remote transceiver having the greatest inbound information power level and to select second inbound information from the remote transceiver having the greatest second inbound information power level;
    said remote transceiver having the greatest inbound information power level is configured to communicate said inbound information to said local transceiver during a first time period; and said remote transceiver having the greatest second inbound information power level is configured to communicate said second inbound information to said local transceiver during a second time period.

12. The multiple antenna cellular network of claim 2, wherein:

each of said remote transceiver includes an RF transceiver to communicate information with said mobile station, and an RF transceiver to communicate RF information with said local transceiver; and said local transceiver includes an RF transceiver to communicate with said remote transceivers, a converter to convert RF information to IF information and to convert IF information to RF information, and an interface circuit to communicate information with said processor.

13. The multiple antenna cellular network of claim 12, wherein:

said remote transceivers are configured to simultaneously transmit said outbound information.

14. The multiple antenna cellular network of claim 13, wherein:

said remote transceivers are configured to vary outbound information output power to move nulls in the cell.

15. The multiple antenna cellular network of claim 1 for further communicating with a second mobile station within a second cell, said network further comprising:

a plurality of second antennas to produce the second cell; and a second transceiver coupled to said second antennas and configured to receive second inbound information from said second mobile station and transmit second outbound information to said second mobile station; and wherein said processor is further coupled to said second transceiver and configured to decode said second inbound information and to encode said second outbound information to communicate with said second mobile station.

16. The multiple antenna cellular network of claim 15, wherein:

said transceiver includes a plurality of remote transceivers each coupled to said antennas and a local transceiver coupled to said processor and coupled to said remote transceivers; and said second transceiver includes a plurality of second remote transceivers each coupled to said second antennas and a second local transceiver coupled to said processor and coupled to said second remote transceivers.

17. The multiple antenna cellular network of claim 16, wherein:

said remote transceivers are configured to vary said outbound information output power to move nulls in the cell; and said second remote transceivers are configured to vary outbound information output power to move nulls in the second cell.

18. The multiple antenna cellular network of claim 16, wherein:

said remote transceivers are configured to simultaneously transmit said inbound information to said local transceiver; and said second remote transceivers are configured to simultaneously transmit said second inbound information to said second local transceiver.

19. The multiple antenna cellular network of claim 18, wherein:

said remote transceivers are configured to simultaneously transmit said outbound information; and said second remote transceivers are configured to simultaneously transmit said second outbound information.

20. The multiple antenna cellular network of claim 19, wherein:

said remote transceivers are configured to vary said outbound information output power to move nulls in the cell; and said second remote transceivers are configured to vary outbound information output power to move nulls in the second cell.

21. The multiple antenna cellular network of claim 16, wherein:

said remote transceivers are configured to measure an inbound information power level from said mobile station and to communicate said inbound information power level to said local transceiver; and said local transceiver is configured to select inbound information from the remote transceiver having the greatest inbound information power level.

22. The multiple antenna cellular network of claim 16 or further communicating with a third mobile station within the cell and a fourth mobile station within the second cell, wherein:

said remote transceivers are configured to measure an inbound information power level from said mobile station and to communicate said inbound information power level to said local transceiver;

said remote transceivers are configured to measure a third inbound information power level from said third mobile station and to communicate said third inbound information power level to said local transceiver;

said local transceiver is configured to select inbound information from the remote transceiver having the greatest inbound information power level and to select third inbound information from the remote transceiver having the greatest third inbound information power level;

said remote transceiver having the greatest inbound information power level is configured to communicate said inbound information to said local transceiver during a first time period;

said remote transceiver having the greatest third inbound information power level is configured to communicate said third inbound information to said local transceiver during a second time period;

said second remote transceivers are configured to measure a second inbound information power level from said second mobile station and to communicate said second inbound information power level to said second local transceiver;

said second remote transceivers are configured to measure a fourth inbound information power level from said fourth mobile station and to communicate said fourth inbound information power level to said second local transceiver;

said second local transceiver is configured to select second inbound information from the second remote transceiver having the greatest second inbound information power level and to select fourth inbound information from the second remote transceiver having the greatest fourth inbound information power level;

said second remote transceiver having the greatest second inbound information power level is configured to communicate said second inbound information to said second local transceiver during a first time period; and said second remote transceiver having the greatest fourth inbound information power level is configured to communicate said fourth inbound information to said second local transceiver during a second time period.

23. The multiple antenna cellular network of claim 15, wherein:

said transceiver includes a plurality of remote transceivers each coupled to said antennas and a local transceiver coupled to said processor and coupled to said remote transceivers;

each of said remote transceivers includes an RF transceiver to communicate information with said mobile station, a converter to convert RF information to IF information and to convert IF information to RF information, and an IF transceiver to communicate IF information with said local transceiver;

said local transceiver includes an IF transceiver to communicate IF information with said remote transceivers and an interface circuit to communicate information with said processor;

said second transceiver includes a plurality of second remote transceivers each coupled to said second antennas and a second local transceiver coupled to said processor and coupled to said second remote transceivers;

each of said second remote transceivers includes an RF transceiver to communicate information with said second mobile station, a converter to convert RF information to IF information and to convert IF information to RF information, and an IF transceiver to communicate IF information with said second local transceiver; and said second local transceiver includes an IF transceiver to communicate IF information with said second remote transceivers and an interface circuit to communicate information with said processor.

24. The multiple antenna cellular network of claim 23, wherein:

said remote transceivers are configured to vary said outbound information output power to move nulls in the cell; and said second remote transceivers are configured to vary outbound information output power to move nulls in the second cell.

25. The multiple antenna cellular network of claim 23, wherein:

said remote transceivers are configured to measure an inbound information power level from said mobile station and to communicate said inbound information power level to said local transceiver; and said local transceiver is configured to select inbound information from the remote transceiver having the greatest inbound information power level.

26. The multiple antenna cellular network of claim 23 for further communicating with a third mobile station within the cell and a fourth mobile station within the second cell, wherein:

said remote transceivers are configured to measure an inbound information power level from said mobile station and to communicate said inbound information power level to said local transceiver;

said remote transceivers are configured to measure a third inbound information power level from said third mobile station and to communicate said third inbound information power level to said local transceiver;

said local transceiver is configured to select inbound information from the remote transceiver having the greatest inbound information power level and to select third inbound information from the remote transceiver having the greatest third inbound information power level;

said remote transceiver having the greatest inbound information power level is configured to communicate said inbound information to said local transceiver during a first time period;

said remote transceiver having the greatest third inbound information power level is configured to communicate said third inbound information to said local transceiver during a second time period;

said second remote transceivers are configured to measure a second inbound information power level from said second mobile station and to communicate said second inbound information power level to said second local transceiver;

said second remote transceivers are configured to measure a fourth inbound information power level from said fourth mobile station and to communicate said fourth inbound information power level to said second local transceiver;

said second local transceiver is configured to select second inbound information from the second remote transceiver having the greatest second inbound information power level and to select fourth inbound information from the second remote transceiver having the greatest fourth inbound information power level;

said second remote transceiver having the greatest second inbound information power level is configured to communicate said second inbound information to said second local transceiver during a first time period; and said second remote transceiver having the greatest fourth inbound information power level is configured to communicate said fourth inbound information to said second local transceiver during a second time period.

27. The multiple antenna cellular network of claim 15, wherein:

said transceiver includes a plurality of remote transceivers each coupled to said antennas and a local transceiver coupled to said processor and coupled to said remote transceivers;

each of said remote transceivers includes an RF transceiver to communicate information with said mobile station, and an RF transceiver to communicate RF information with said local transceiver;

said local transceiver includes an RF transceiver to communicate with said remote transceivers, a converter to convert RF information to IF information and to convert IF information to RF information, and an interface circuit to communicate information with said processor;

said second transceiver includes a plurality of second remote transceivers each coupled to said second antennas and a second local transceiver coupled to said processor and coupled to said second remote transceivers;

each of said second remote transceivers includes an RF transceiver to communicate information with said second mobile station, and an RF transceiver to communicate RF information with said second local transceiver; and said second local transceiver includes an RF transceiver to communicate with said second remote transceivers, a converter to convert RF information to IF information and to convert IF information to RF information, and an interface circuit to communicate information with said processor.

28. The multiple antenna cellular network of claim 27, wherein:

said remote transceivers are configured to simultaneously transmit said outbound information; and said second remote transceivers are configured to simultaneously transmit said second outbound information.

29. The multiple antenna cellular network of claim 28, wherein:

said remote transceivers are configured to vary said outbound information output power to move nulls in the cell; and said second remote transceivers are configured to vary outbound information output power to move nulls in the second cell.

30. A method of communicating with a mobile station in a cell using a multiple antenna cellular network having a plurality of antennas positioned to produce the cell, a plurality of remote transceivers coupled to said antennas and configured to receive inbound information from said mobile station and transmit outbound information to said mobile station, a local transceiver coupled to said remote transceivers and to a processor configured to decode said inbound information and to encode said outbound information to communicate with said mobile station, said method comprising the steps of:

transmitting a control word containing address information and configuration information for individual remote transceivers between the local transceiver and the remote transceivers;

individually configuring said each remote transceiver using said control word to vary outbound information output power to move nulls in the cell;

simultaneously transmitting outbound information by each remote transceivers; and receiving inbound information by at least one remote transceiver.

31. The method of claim 30, further comprising the steps of:

measuring inbound information power level from said mobile station and communicating said inbound information power level to said local transceiver; and selecting inbound information from the remote transceiver having the greatest inbound information power level.

32. The method of claim 30 for further communicating with a second mobile station within the cell, said method further comprising the steps of:

measuring inbound information power level from said mobile station and communicating said inbound information power level to said local transceiver;

measuring second inbound information power level from said second mobile station and communicating said second inbound information power level to said local transceiver;

selecting inbound information from the remote transceiver having the greatest inbound information power level;

selecting second inbound information from the remote transceiver having the greatest second inbound information power level;

communicating said inbound information to said local transceiver during a first time period; and communicating said second inbound information to said local transceiver during a second time period.

33. The method of claim 32, further comprising the step of varying second outbound information output power to move nulls in the cell.

* * * * *